July 22, 1969  H. G. ANDREAE  3,456,779
DUNG REMOVER FOR CATTLE SHEDS
Filed July 29, 1966  3 Sheets-Sheet 1

INVENTOR.
HANS GEORG ANDREAE
BY
Davis, Hoxie, Faithfull & Hapgood
ATTORNEYS.

United States Patent Office 3,456,779
Patented July 22, 1969

3,456,779
DUNG REMOVER FOR CATTLE SHEDS
Hans Georg Andreae, Donauworth, Germany, assignor to Alfa-Laval AB, Tumba, Sweden, a corporation of Sweden
Filed July 29, 1966, Ser. No. 568,919
Claims priority, application Germany, July 30, 1965, A 24,151
Int. Cl. B65g 19/02
U.S. Cl. 198—222                5 Claims

ABSTRACT OF THE DISCLOSURE

A drag bucket comprises two scrapers interconnected to form a V-shape and each having a lower edge resting on the shed floor, the scrapers being interconnected at their inner end portions through pivot means located adjacent a head formed by the tip of the V-shaped, and a traction device connected to the drag bucket in the region of said head is operable to pull the bucket along the bisector of the V-shape in an operating direction in which the free outer ends of the scrapers precede the head, to effect dung removal. The traction device is reversible to pull the drag bucket in a direction opposite to said operating direction, which causes the scrapers to swing horizontally relative to each other about the pivot means and thereby collapse the V-shape, and means are provided for limiting expansion of the V-shape in response to pulling of the bucket in the operating direction.

The present invention relates to dung removers for cattle sheds and has particular reference to improvements in such removers.

Dung removers known heretofore comprise a scraping device which, by means of a traction arrangement, is dragged over the floor of the cattle shed, usually in manure gutters. Generally in such removers, the scraper is arranged at right angles in relation to the direction of movement, and in some cases the remover includes multiple scrapers. The manure therefore is dragged generally by the whole breadth of the scraper and in a direction parallel to the direction of movement of the scraper, whereby the scraper is subjected to considerable stresses, particularly if it has any appreciable breadth. Consequently, such dung removers usually are arranged to clear only a comparatively narrow strip of the floor. A further consequence is that their use is limited almost entirely to cattle sheds of the old type in which the cattle are tethered in a row of stalls.

In modern cattle sheds, the animals are usually allowed to move freely over the major part of the floor. Thus, there is a need for dung removers of quite a new type that will be able to clear the manure along a much wider strip. At the same time, such removers must be comparatively light and on the whole constructed so that they will not cause injury to the animals, as due to bumping their legs against a remover. It is further desirable that the dung remover operate automatically and without any supervision whatever. These desiderata are fulfilled by the dunk remover according to the present invention.

A dung remover made according to the present invention comprises a drag bucket including two scrapers arranged in a V-shape with each scraper resting on its lower edge. The remover also comprises a traction device attached to the head or bisector of the V-shape and arranged to pull the drag bucket in the direction of the bisector and with the free outer ends of the scrapers in advance of the narrow tip of the V-shape, to effect dung removal.

Figure 1:
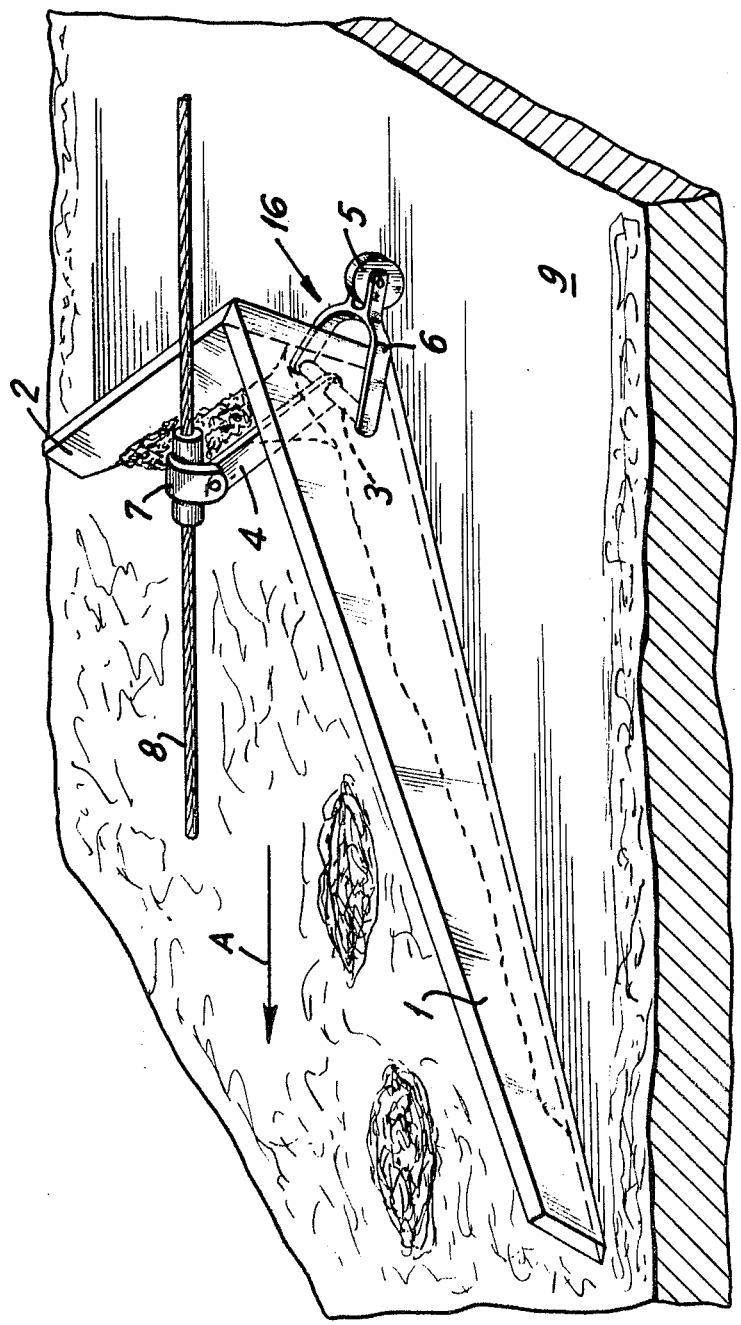
Figure 2:
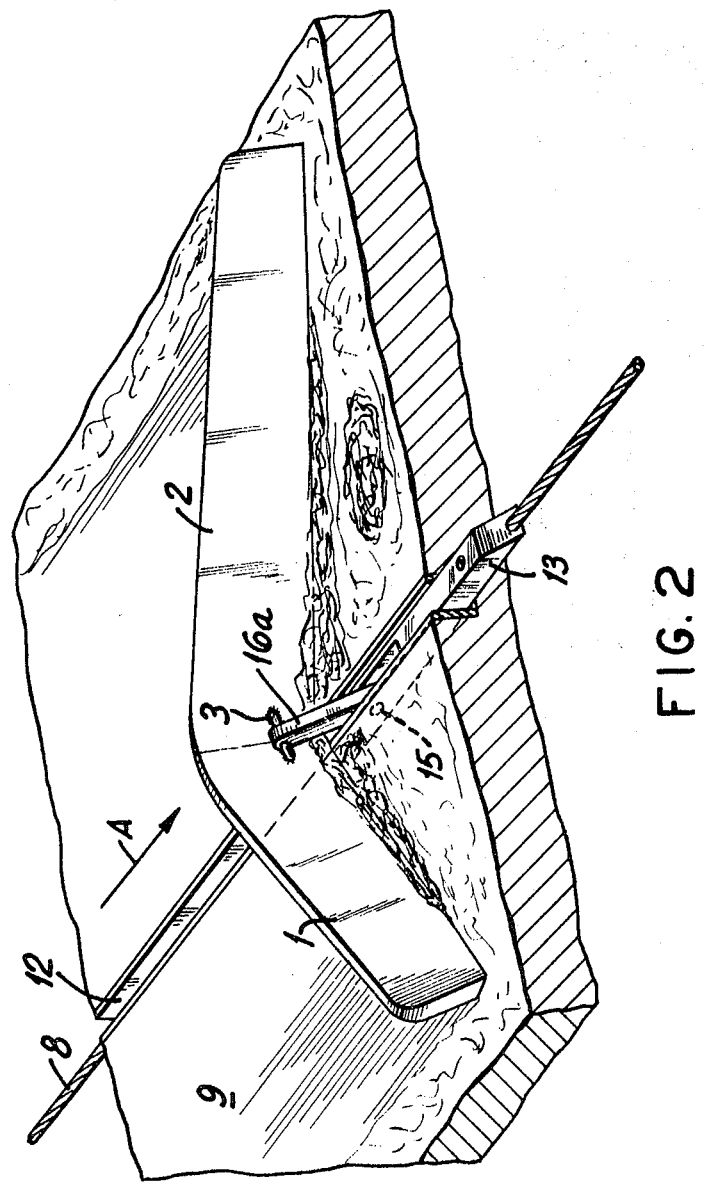
Figure 3:
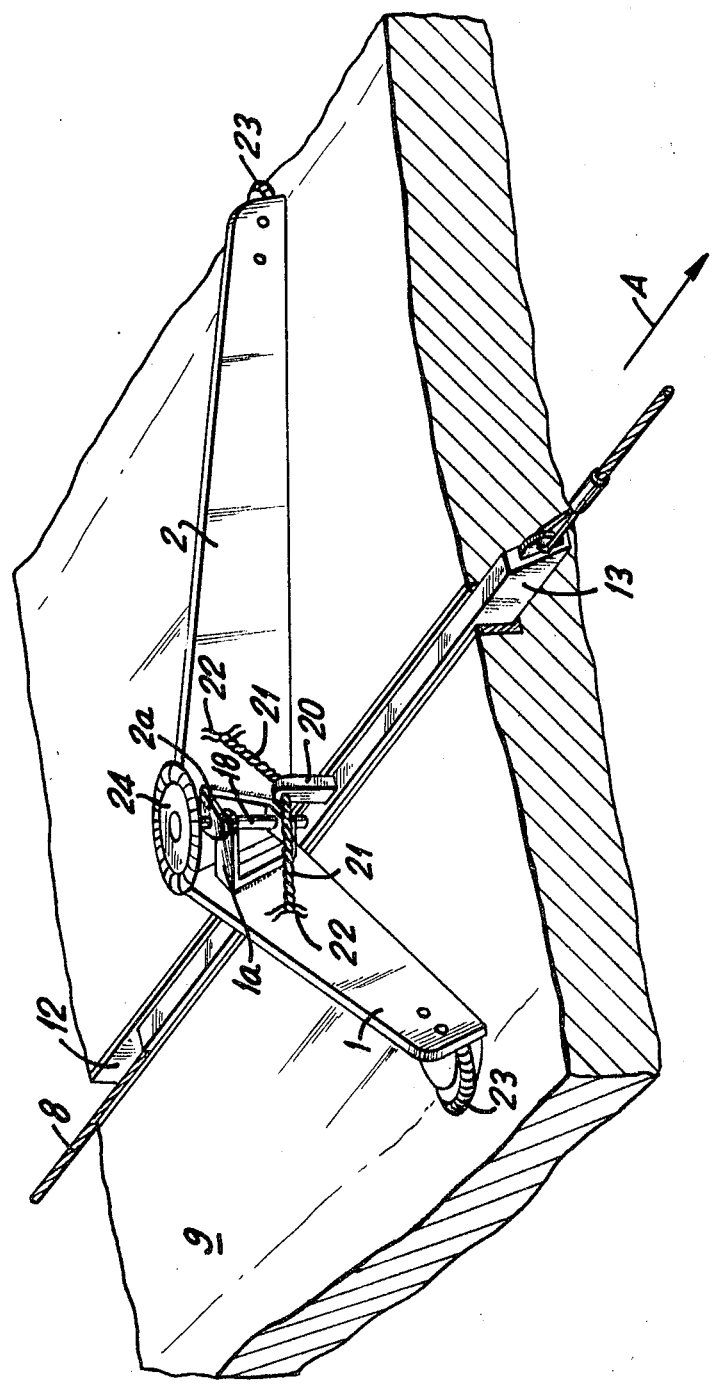

The invention will be described more in detail below with reference to the accompany drawings in which FIGS. 1, 2 and 3 are perspective views of three different embodiments of the invention.

In the embodiment shown in FIG. 1, the dung remover comprises a drag bucket consisting of two scrapers 1 and 2 having adjacent ends which are rigidly interconnected, as by means of welding, so that the scrapers form a V-shape and the lower edge of each scraper is adapted to rest upon the floor 9 of the cattle shed. To clear the manure, a traction device comprising a steel wire pulls the drag bucket along the floor 9, possibly below a grid (not shown) in the floor, in the direction of the bisector of the V-shape, and with the free outer ends of the scrapers preceding the narrow tip of the V-shape. This narrow tip, formed at the juncture of the scrapers 1 and 2, may be referred to as the head of the drag bucket.

The purpose of the V-shape of the drag bucket is to give the scraped manure a movement that has a component perpendicular to the direction of the movement of the bucket. The manure will thus slide along the scrapers to the center of the bucket, and the bucket will thus be subjected to only comparatively small stresses. The scrapers, and consequently the whole dung remover, may therefore be made lighter and dimensioned to operate on a comparatively large breadth. In order to support the clearing operation and make the construction as a whole more effective, the scrapers also have a decreasing height in the direction towards their free outer ends and, in addition, the scrapers are tiled with their upper edges outwards from the Vshape.

When the drag bucket has been pulled along the floor of the cattle shed (or along any other surface), it must be pulled back to its starting point. In order to prevent this return movement from producing an effect similar to that of a snowplough, by pushing towards the sides any new manure fallen in the meantime, at least the main part of the drag bucket should be lifted above the floor level. This is achieved by lifting the head of the bucket and allowing the bucket to slide across the floor on the free ends of the scrapers. For this purpose, a special connection is provided between the drag bucket and the wire 8. This connection comprises a lever designated generally by reference numeral 16 and having a horizontal pivot pin 3 rotatably journalled in the scrapers 1 and 2 near the head of the drag bucket, the pin 3 extending perpendicular to the direction of movement of the drag bucket. The wire 8 is pivotally attached to the free end of an arm 4 of the lever 16 by means of a fitting 7 in the form of a U-shaped link. Another arm 6 of the lever is fork-shaped, and in this embodiment it is located outside the V-shape and carries a wheel 5 opposite the head of the V-shaped drag bucket. In the dung clearing operation, the wire 8 is pulled in the direction of the arrow A, whereby the lever arm 4 assumes a lowered position to allow the lower edges of the scrapers to rest along their entire lengths on the floor of the cattle shed. When wire 8 is pulled in the opposite direction to return the drag bucket to the starting point, lever 4 is pulled to a raised position so as to lower the free end of the forked lever 6, thereby forcing the wheel 5 against the floor of the cattle shed. Thus, the head of the bucket is lifted above the floor level, and consequently the bucket rests on the free outer ends of the scrapers as it slides along the floor.

In the embodiment according to FIG. 2, the lever 16a has a different shape. Here, its horizontal pivot pin 3, journalled as in the FIG. 1 embodiment, is located at one end of the lever. The other end of lever 16a is connected by a pivot pin 15 to a part 13 of the traction device, the part 13 being guided in a groove 12 in the floor of the cattle shed. The wire 8 is attached to this part 13. The drag bucket will rest on the floor of the cattle shed along the entire lengths of the scrapers 1 and 2, when wire 8 is pulled in the direction of arrow A to effect dung removal. Since the return movement is resisted by the friction between the drag bucket and the floor, the pulling of wire 8 in the direction opposite to that of arrow A will cause lever 16a to tilt upwardly around its pivot pin 3, thereby raising the head of the drag bucket above the floor level. Thus, the bucket will rest on the free outer ends of the scrapers as it slides along the floor in its return movement. The scrapers of the bucket are shaped the same way as those of the embodiment shown in FIG. 1.

As in the FIG. 2 embodiment, the embodiment shown in FIG. 3 has a traction device comprising a part 13 in the form of a bar that is guided in a groove 12 in the floor of the cattle shed. Of course, the wire 8 runs in this groove as well. In this embodiment, there is a vertical pin 18 firmly attached to the part 13. The inner ends of the scrapers 1 and 2 have brackets 1a and 2a, respectively, located within the V-shape and adjacent its head; and these brackets are rotatably journalled on pin 18. Thus, the scrapers are not rigidly attached to each other at the head; and when the drag bucket is pulled back after a dung removal stroke, the scrapers swing inwardly about the vertical pin 18 and slide along the floor of the cattle shed in a collapsed condition in which the scrapers extend parallel to each other. On the other hand, when wire 8 is pulled in the direction of arrow A to effect the dung removal stroke, the scrapers are forced to swing outward about the pin 18 and form the desired V-shape, the angle of which is determined by the length of chains 21. These two chains are attached at their outer ends to loops 22 on the scrapers 1 and 2, respectively, and at their inner ends to a bracket 20 on the part 13. The chains, of course, may be replaced by suitably arranged stops on part 13.

Particularly if the drag bucket is working over a very large breadth, it may be necessary to guide and support the free ends of the scrapers during dung removal. The embodiment according to FIG. 3 is therefore provided with guiding rollers 23 at the free ends of the scrapers, these rollers being arranged to engage vertical guides (not shown) on the floor of the cattle shed.

As previously mentioned, dung removers of the present kind, which are intended to work automatically, should as far as possible be constructed so that the animals will not be injured or alarmed by them. The embodiment according to FIG. 3 is therefore provided at the head of the drag bucket with a circular guard disc 24 which is rotatable around a vertical axis. The disc 24 has an elastic edge, such as rubber, and prevents the animals from being injured by the head of the drag bucket.

The wire 8 of the traction device is attached to the drag bucket in one way or another, as previously described. In a preferred embodiment, the wire is endless and, by means of a windlass with an electric motor, is arranged to pull the drag bucket between two end points. At these end points, there are switches for controlling the motor of the windlass. The dung remover is so arranged that when the drag bucket arrives at one end point, it will act upon its switch so as to reverse the direction of rotation of the motor and thereby cause the drag bucket to be pulled back to the other end point. Whereupon it will act upon the other switch to effect another reversal of the direction of rotation of the motor. The electric circuit of the motor may also be provided with a contact clock arranged to keep the drag bucket working during predetermined periods of time. Thus, the device will be completely automatic and will need no supervision.

It has been observed that the dung remover according to the invention does not disturb or alarm the animals if the drag bucket has a suitably adjusted speed. It has been found that this speed should not exceed 15 meters per minute.

I claim:
1. In a dung remover for cattle sheds, the combination of a drag bucket comprising two scrapers interconnected to form a V-shape and each having a lower edge adapted to rest on the shed floor, the drag bucket having a head fromed by the tip of the V-shape, a traction device connected to the drag bucket in the region of said head and operable to pull the bucket along the bisector of the V-shape in an operating direction in which the free outer ends of the scrapers precede said head, to effect dung removal, said traction device being reversible to pull the drag bucket in a direction opposite to said operating direction, pivot means adjacvent said head and through which the inner end portions of the scrapers are interconnected, the scrapers being swingable horizontally relative to each other about said pivot means to collapse the V-shape in response to pulling of the drag bucket in said opposite direction, and means for limiting expansion of said V-shape in response to pulling of the bucket in said operating direction, said scrapers being inclined to cause their upper edges to be located forward of their lower edges, reckoned in the direction in which the V-shape points.

2. In a dung remover for cattle sheds, the combination of a drag bucket comprising two scrapers interconnected to form a V-shape and each having a lower edge adapted to rest on the shed floor, the drag bucket having a head formed by the tip of the V-shape, a traction device connected to the drag bucket in the region of said head and operable to pull the bucket along the bisector of the V-shape in an operating direction in which the free outer ends of the scrapers precede said head, to effect dung removal, said traction device being reversible to pull the drag bucket in a direction opposite to said operating direction, pivot means adjacent said head and through which the inner end portions of the scrapers are interconnected, the scrapers being swingable horizontally relative to each other about said pivot means to collapse the V-shape in response to pulling of the drag bucket in said opposite direction, and means for limiting expansion of said V-shape in response to pulling of the bucket in said operating direction, said limiting means including a chain connecting each scraper to the traction device.

3. In a dung remover for cattle sheds, the combination of a drag bucket comprising two scrapers interconnected to form a V-shape and each having a lower edge adapted to rest on the shed floor, the drag bucket having a head formed by the tip of the V-shape, a traction device connected to the drag bucket in the region of said head and operable to pull the bucket along the bisector of the V-shape in an operating direction in which the free outer ends of the scrapers precede said head, to effect dung removal, said traction device being reversible to pull the drag bucket in a direction opposite to said operating direction, pivot means adjacent said head and through which the inner end portions of the scrapers are interconnected, the scrapers being swingable horizontally relative to each other about said pivot means to collapse the V-shape in response to pulling of the drag bucket in said opposite direction, and means for limiting expansion of said V-shape in response to pulling of the bucket in said operating direction, the traction device including a bar adapted to be guided in a groove in the shed floor, said pivot means being secured to the bar.

4. In a dung remover for cattle sheds, the combination of a drag bucket comprising two scrapers interconnected to form a V-shape and each having a lower edge adapted to rest on the shed floor, the drag bucket having a head formed by the tip of the V-shape, a traction device connected to the drag bucket in the region of said head and operable to pull the bucket along the bisector of the V-shape in an operating direction in which the free outer ends of the scrapers precede said head, to effect dung removal, said traction device being reversible to pull the drag bucket in a direction opposite to said operating direction, pivot means adjacent said head and through which the inner end portions of the scrapers are interconnected, the scrapers being swingable horizontally relative to each other about said pivot means to collapse the V-shape in response to pulling of the drag bucket in said opposite direction, and means for limiting expansion of said V-shape in response to pulling of the bucket in said operating direction, the combination comprising also a circular guard disc mounted on the bucket at the head portion thereof and rotatable relative to the bucket around a generally vertical axis, the edge of the disc being engageable with a leg of an animal standing on the shed floor.

5. The combination according to claim 4, in which said edge is elastic.

References Cited

UNITED STATES PATENTS 2,984,338  5/1961  Pockman _____ 198—224

FOREIGN PATENTS 25,519  6/1963  Germany.
920,999  12/1954  Germany.
39,419  6/1965  Germany.
688,748  3/1953  Great Britain.
693,752  7/1940  Germany.

EDWARD A. SROKA, Primary Examiner

U.S. Cl. X.R.

198—224